Figure 1:
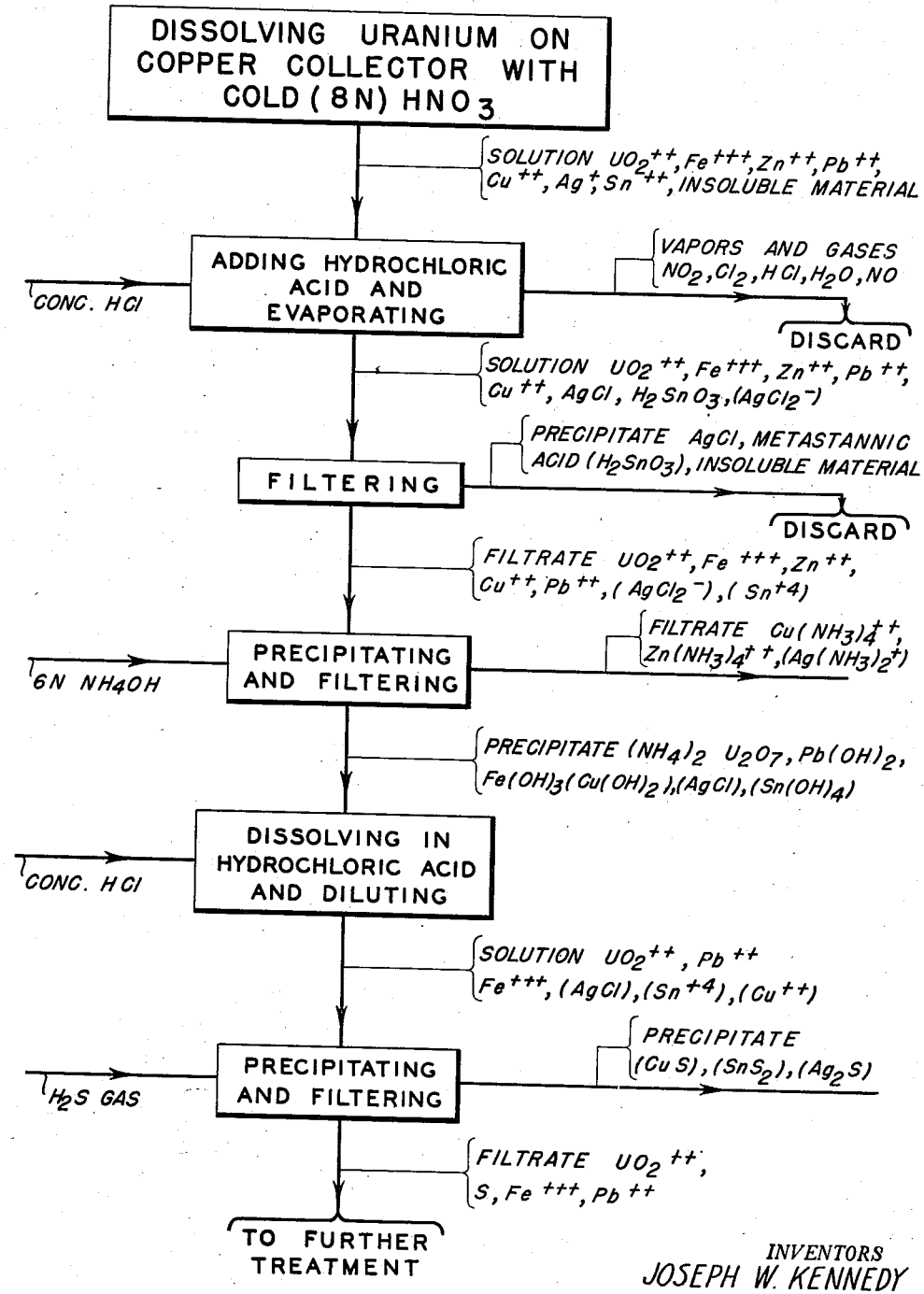

Aug. 26, 1958 J. W. KENNEDY ET AL 2,849,285
METHOD FOR PURIFYING URANIUM
Original Filed June 26, 1944 2 Sheets-Sheet 1

INVENTORS
JOSEPH W. KENNEDY
EMILIO G. SEGRE
BY *Robert A. [signature]*
ATTORNEY

Aug. 26, 1958     J. W. KENNEDY ET AL     2,849,285

METHOD FOR PURIFYING URANIUM

Original Filed June 26, 1944     2 Sheets-Sheet 2

INVENTORS
JOSEPH W. KENNEDY
EMILIO G. SEGRE

BY
ATTORNEY 2,849,285

METHOD FOR PURIFYING URANIUM

Joseph W. Kennedy, Berkeley, Calif., and Emilio G. Segre, Santa Fe, N. Mex., assignors to the United States of America as represented by the United States Atomic Energy Commission Original application June 26, 1944, Serial No. 542,220. Divided and this application July 21, 1945, Serial No. 606,407

2 Claims. (Cl. 23—14.5)

This invention relates to the purification of uranium, and more particularly, to the preparation of uranium in such a highly purified form that the method of determining the isotopic constituency of uranium according to the procedure described and claimed in the copending application Serial No. 536,440, filed May 19, 1944, by Emilio G. Segre and Joseph W. Kennedy, now abandoned, may be readily applied thereto. The present application is a division of the copending application Serial No. 542,220, filed June 26, 1944, by Joseph W. Kennedy and Emilio G. Segre, now abandoned.

Natural uranium comprises three isotopes, namely, $U^{238}$, $U^{235}$ and $U^{234}$. This is true in general of uranium obtained by treating natural uranium in an isotope enriching device, such as a calutron of the type described and claimed in the copending application Serial No. 557,784, filed October 9, 1944, by Ernest O. Lawrence, issued as Patent No. 2,709,222 on May 24, 1955. In the method of analyzing uranium for the polyisotope comprising the aforementioned three uranium isotopes, as described in application Serial No. 536,440, three independent measurements are required. These are a measurement of the mass, a measurement of the rate of radioactive disintegration or the alpha activity, and a measurement of slow-neutron-produced fission.

In order to measure the true mass of the uranium which is analyzed, the uranium must be chemically purified and converted into a known compound, so that by weighing the compound and applying the appropriate gravimetric factor the true mass of the uranium in the compound can be determined. A suitable compound for this purpose is the oxide of uranium, $U_3O_8$.

In order to measure the true rate of radioactive disintegration or the alpha activity of the sample of uranium which is analyzed, care must be taken so that the full count of alpha-particles resulting from the disintegration is obtained. If the sample of uranium, in the form of $U_3O_8$, which is measured for alpha activity is too thick, some of the alpha-particles arising from the disintegration of uranium atoms are unable to penetrate the thickness of the $U_3O_8$ and are absorbed therein. The alpha-particles which do not penetrate the thickness of the $U_3O_8$, of course, are not counted by the devices commonly used for alpha activity measurements and, accordingly, the full alpha activity is not measured. It will be understood that "full count of alpha-particles" and similar expressions refer to the emission of alpha-particles from one face of the sample. In view of the absorption effect, it is necessary to prepare the sample of uranium that is to be subjected to analysis in the form of a substantially uniform film of $U_3O_8$ which is sufficiently thin so that there is a negligible absorption of alpha particles in the film. This thin film is deposited on a suitable supporting or backing member, such as a disk of sheet platinum or other noble metal, thereby constituting a target which in turn is supported upon a copper base plate, the whole then being employed in making the desired alpha activity and fission activity measurements.

The maximum thickness allowable for a film of $U_3O_8$ is taken to be that thickness which corresponds to about 400 micrograms of uranium per square centimeter. In the case of a substantially uniform $U_3O_8$ film of this thickness, approximately two to three percent of the alpha-particles originating within the film will be absorbed therein. Often in making isotopic analyses, substantially uniform $U_3O_8$ films of thickness of the order of magnitude corresponding to 40 micrograms of uranium per square centimeter are employed. Such a film absorbs only about 0.2 to 0.3% of the alpha-particles.

It may be noted that thin, uniform films of $U_2O_8$ which are satisfactory for alpha activity measurements are also satisfactory for slow-neutron-produced fission measurements.

In view of the foregoing, in the preparation of samples of uranium which are to be analyzed for their isotopic composition, it is necessary chemically to purify the uranium and then to deposit the uranium in a convenient chemical form as a thin film which has a uniform thickness corresponding to a density of less than about 400 micrograms of uranium per square centimeter. The parent application Serial No. 542,220 describes in detail a procedure for preparing a target of purified uranium for isotopic analysis, and contains claims directed to both the procedure and the target so prepared. The present application claims a method for producing uranium of an extremely high degree of purity, suitable for isotopic analysis or otherwise.

Accordingly, it is an object of the invention to provide a method for obtaining uranium in an extremely pure form.

Another object of the invention is to provide a method for preparing a sample of uranium of such purity that it may be subjected to analysis for its uranium isotope content.

A still further object of the invention is to provide a process for purifying a sample of uranium and obtaining the uranium so purified in the form of a suitable uranium compound, such as $U_3O_8$.

A further object of the invention is to provide a method for recovering uranium from the collectors of an isotope enriching device such as a calutron, and for purifying the uranium so recovered so that the isotopic composition of the uranium present in the collectors of the isotope enriching device may be determined.

Figure 2:
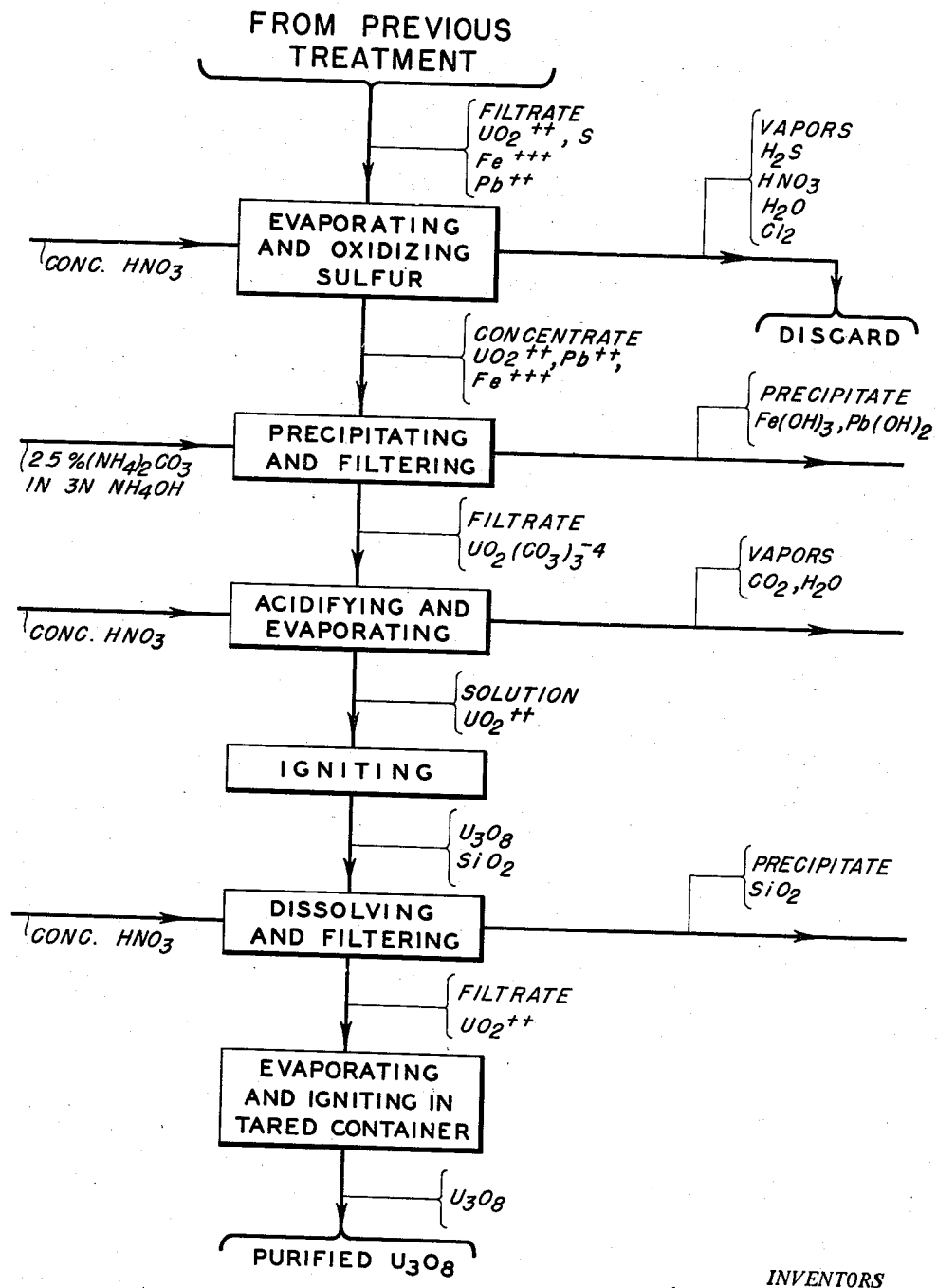

Other objects and advantages of the invention will appear from the following detailed description, taken in conjunction with the accompanying drawings, in which Figure 1 is a diagrammatic flow sheet showing the initial steps in the method, and Fig. 2 is a diagrammatic flow sheet showing further steps leading to the production of uranium in the form of a suitable compound, such as $U_3O_8$, that has been substantially completely freed from associated impurities.

Referring now to Fig. 1, uranium which has been deposited on the collectors, taken for purposes of illustration to be constructed chiefly of copper, of an isotope enriching machine such as the calutron referred to above, is dissolved by giving the copper surfaces to which the uranium has adhered an etching treatment with cold moderately concentrated nitric acid, e. g., 8 N. The solution resulting from the nitric acid treatment contains uranium as uranyl ion, $UO_2^{++}$, a considerable amount of copper as cupric ion, $Cu^{++}$, the copper being present due to partial solution of the collector, a little iron which may be present due to the fact that iron is sputtered into the collector from the steel calutron vacuum tank, a little tin and lead from soft solder joints in the collector, a little silver and zinc from hard solder joints in the collector, and insoluble material such as bits of graphite from carbon parts of the collector. To the solution there is added hydrochloric acid in an amount in excess of that required to destroy all of the nitrate, and then the solution is boiled, whereby nitric acid present is destroyed to form NO and $NO_2$ and most of the excess HCl is removed. By this treatment a hydrochloric acid solution of the chlorides of the dissolved metals is formed. Tin, although partially soluble in the solution, is largely present as a precipitate of metastannic acid, and most of the silver is present as a precipitate of silver chloride. The solution is then filtered, whereby silver chloride, metastannic acid and other insoluble materials, including bits of carbon, are separated from the solution and discarded. The filtrate, which contains the uranium, iron, copper, lead, and small amounts of tin, zinc and silver, is then treated with dilute carbon dioxide-free ammonium hydroxide, e. g., 6 N, whereby a precipitate comprising ammonium diuranate, lead hydroxide, and iron hydroxide is formed, which contains traces of silver, tin and copper, the amount of ammonium hydroxide being in excess of that required for complete precipitation. The filtrate contains all of the zinc and practically all of the copper as complex ammonio ions. The solution is filtered and the precipitate, after being washed with a solution of carbon dioxide-free ammonium hydroxide, is dissolved in concentrated hydrochloric acid and diluted so that the solution is about 1 to 2 N in hydrochloric acid. The solution, which contains uranium, lead, iron, and traces of silver, tin and copper, is saturated with hydrogen sulfide gas, whereby a precipitate of copper, silver, and tin sulfides is formed. The solution is filtered and the precipitate is discarded. The filtrate contains uranium, iron, lead, and a small amount of sulfur which has resulted from the oxidation of hydrogen sulfide.

The filtrate is then given further treatment, as outlined in Fig. 2. More particularly, the filtrate is evaporated to a small volume to remove hydrogen sulfide and then concentrated nitric acid, e. g., 15 N, is added and the mixture is boiled, whereby hydrochloric acid in the solution is decomposed and any sulfur present is oxidized to sulfate, the amount of nitric acid required being enough to oxidize all of the chloride and the sulfur present. Next, an approximately 2½% by weight ammonium carbonate solution in 3 N ammonium hydroxide is added in excess to the solution, whereby a precipitate of ferric hydroxide and lead hydroxide is formed, the amount of ammonium carbonate added being in excess of that required for complete precipitation of the ferric hydroxide and the lead hydroxide. Uranium, which forms the complex ion $UO_2(CO_3)_3^{-4}$, remains in solution. The solution is filtered and the precipitate is washed with an approximately 2½% by weight ammonium carbonate solution in 3 N ammonium hydroxide. The filtrate now contains uranium which has been substantially completely separated from metal impurities. The filtrate is acidified with concentrated nitric acid and concentrated by evaporation, whereby carbonate present is decomposed and carbon dioxide evolved. The resulting solution containing the uranium in the form of uranyl ion, $UO_2^{++}$, is next evaporated to dryness and the residue is then ignited at a dull red heat on a platinum disk, whereby uranium present is converted to $U_3O_8$. There is found with it a certain amount of silica which results from a slight solution of the various glass vessels in which the above-described manipulations have taken place. The $U_3O_8$ admixed with silica is then treated with concentrated nitric acid, whereby the $U_3O_8$ is dissolved while the silica is left as an insoluble residue. The nitric acid solution of uranium is separated from the silica by filtering and the nitric acid solution is then placed in a tared platinum container and evaporated to dryness, the residue then being ignited at a dull red heat, whereby pure $U_3O_8$ is produced.

The pure $U_3O_8$ produced in this manner is ready for use as such, or, if desired, it may be converted to other desired compounds of uranium, for example uranyl nitrate, by methods that may be known per se. One procedure for preparing it in the form of a thin uniform film of $U_3O_8$ upon a noble metal backing member, in which form it is eminently adapted for carrying out the isotopic analysis according to the aforementioned Segre-Kennedy procedure, is described in detail in the parent application Serial No. 542,220, previously mentioned, and to which application those interested are referred for further details.

While there has been described what is at present considered to be the preferred embodiment of the invention, it will be understood that various modifications may be made therein. It will also be understood that the term "uranium" in the specification and claims, is used broadly to refer to substances comprising uranium without regard to its state of combination except as otherwise indicated by the context. It is intended to cover in the appended claims all such modifications as fall within the true spirit and scope of the invention.

What is claimed is:

1. The method of purifying a sample of uranium comprising treating the sample with nitric acid, whereby uranium and metal impurities such as copper, iron, zinc, lead, silver and tin are put in solution, adding excess hydrochloric acid and boiling the solution, whereby nitric acid is substantially completely removed, filtering the solution, whereby insoluble impurities such as silver chloride, metastannic acid and bits of carbon are removed from the solution, precipitating the uranium in the solution as ammonium diuranate by adding ammonium hydroxide, and filtering, whereby uranium and impurities such as lead and iron along with traces of copper, silver and tin are separated as a precipitate from impurities such as copper, zinc and silver which remain in solution as ammonio complex ions, dissolving the precipitate to form a dilute hydrochloric acid solution of uranium with impurities such as lead, iron, copper, silver and tin, saturating the hydrochloric acid solution with $H_2S$ and filtering, whereby impurities such as copper, tin and silver are removed from the solution, boiling the solution, whereby $H_2S$ is removed, adding concentrated nitric acid and heating, whereby any sulfur in the solution is oxidized, treating the solution with an excess of ammonium carbonate-ammonium hydroxide reagent and filtering, whereby impurities such as iron and lead are separated from uranium which remains in solution, acidifying the solution with nitric acid, evaporating the solution to a dry residue, igniting the residue at a red heat, whereby the uranium in the residue is converted to $U_3O_8$, dissolving the $U_3O_8$ in nitric acid and filtering the solution, whereby silica is separated from the solution, evaporating the solution and igniting the residue, whereby substantially pure $U_3O_8$ is produced.

2. The method of recovering uranium in substantially pure form from metal surfaces comprising dissolving the uranium on the said surfaces with nitric acid, whereby uranium and metal impurities such as copper, iron, zinc, lead, silver and tin are put in solution, adding excess hydrochloric acid and boiling the solution, whereby nitric acid is substantially completely removed, filtering the solution, whereby insoluble impurities such as silver chloride, metastannic acid and bits of carbon are removed from the solution, precipitating the uranium in the solution as ammonium diuranate by adding ammonium hydroxide, and filtering, whereby uranium and impurities such as lead and iron along with traces of copper, silver and tin are separated as a precipitate from impurities such as copper, zinc and silver which remain in solution as ammonio complex ions, dissolving the precipitate to form a dilute hydrochloric acid solution of uranium with impurities such as lead, iron, copper, silver and tin, saturating the hydrochloric acid solution with $H_2S$ and filtering, whereby impurities such as copper, tin and silver are removed from the solution, boiling the solution, whereby $H_2S$ is removed, adding concentrated nitric acid and heating, whereby any sulfur in the solution is oxidized, treating the solution with an excess of ammonium carbonate-ammonium hydroxide reagent and filtering, whereby impurities such as iron and lead are separated from uranium which remains in solution, acidifying the solution with nitric acid, evaporating the solution to a dry residue, igniting the residue at a red heat, whereby the uranium in the residue is converted to $U_3O_8$, dissolving the $U_3O_8$ in nitric acid and filtering the solution, whereby silica is separated from the solution, evaporating the solution and igniting the residue, whereby substantially pure $U_3O_8$ is produced.

References Cited in the file of this patent

Mellor: "Inorganic and Theoretical Chemistry," vol. 12, pages 32, 117, Longmans, London (1932).

Lange's Handbook of Chemistry, 5th ed., page 1124, Handbook Publishers, Inc., Sandusky, Ohio (1944).